United States Patent
Sharma et al.

(10) Patent No.: US 12,273,777 B2
(45) Date of Patent: Apr. 8, 2025

(54) COMMUNICATIONS DEVICE, INFRASTRUCTURE EQUIPMENT AND METHODS FOR CONTROLLING CELL RESELECTION OF NON-PUBLIC-NETWORK CELLS

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 332 days.

(21) Appl. No.: 17/614,579

(22) PCT Filed: Apr. 30, 2020

(86) PCT No.: PCT/EP2020/062039
§ 371 (c)(1),
(2) Date: Nov. 29, 2021

(87) PCT Pub. No.: WO2020/249302
PCT Pub. Date: Dec. 17, 2020

(65) Prior Publication Data
US 2022/0256416 A1    Aug. 11, 2022

(30) Foreign Application Priority Data
Jun. 12, 2019 (EP) ..................... 19179812

(51) Int. Cl.
*H04W 36/00* (2009.01)
*H04W 48/20* (2009.01)

(52) U.S. Cl.
CPC ....... *H04W 36/0061* (2013.01); *H04W 48/20* (2013.01)

(58) Field of Classification Search
CPC ....... H04W 36/0083; H04W 36/00835; H04W 36/0061; H04W 36/08
See application file for complete search history.

(56) References Cited

U.S. PATENT DOCUMENTS

2010/0029283 A1* 2/2010 Iwamura ............... H04W 48/12
                                                                  455/437
2010/0130212 A1* 5/2010 So ......................... H04W 36/04
                                                                  455/444

(Continued)

FOREIGN PATENT DOCUMENTS

EP    2458921 A1    5/2012

OTHER PUBLICATIONS

International Search Report and Written Opinion mailed on Jul. 2, 2020, received for PCT Application PCT/EP2020/062039, Filed on Apr. 30, 2020, 15 pages.

(Continued)

*Primary Examiner* — Jeong S Park
(74) *Attorney, Agent, or Firm* — XSENSUS, LLP

(57) ABSTRACT

A method of selecting a cell by a communications device in a wireless communications network comprises receiving from the wireless communications network an indication of a range of physical cell identifiers associated with one or more cells belonging to one or more non-public networks which form part of the wireless communications network which also includes public network cells, detecting signals received from a serving cell and signals received from one or more candidate cells in order to determine whether to remain attached to a currently serving cell or to reselect one of the candidate cells according to a cell reselection procedure when in an idle mode in which the communications device is not transmitting data to or receiving data from the wireless communications network.

20 Claims, 7 Drawing Sheets

(56) References Cited

U.S. PATENT DOCUMENTS

| | | | | |
|---|---|---|---|---|
| 2011/0237258 | A1* | 9/2011 | Nylander | H04W 36/0061 455/437 |
| 2012/0021725 | A1* | 1/2012 | Rune | H04W 48/16 455/411 |
| 2012/0099442 | A1* | 4/2012 | Bakker | H04W 24/08 370/242 |
| 2013/0012216 | A1* | 1/2013 | Chen | H04W 76/12 455/450 |
| 2013/0013797 | A1* | 1/2013 | Henttonen | H04W 8/18 709/229 |
| 2013/0077515 | A1 | 3/2013 | Jung et al. | |
| 2013/0089029 | A1* | 4/2013 | Jang | H04W 8/186 370/328 |
| 2014/0220978 | A1* | 8/2014 | Wu | H04W 36/0061 455/436 |
| 2018/0049036 | A1* | 2/2018 | Sethi | H04W 16/14 |
| 2018/0227822 | A1* | 8/2018 | Lin | H04W 36/302 |
| 2020/0322856 | A1* | 10/2020 | Wang | H04W 36/04 |
| 2021/0136663 | A1* | 5/2021 | Liu | H04W 48/16 |

OTHER PUBLICATIONS

3GPP, "Service requirements for the 5G system; Stage 1 (Release 16)", 3GPP TS 22.261 V16.7.0, Mar. 2019, 72 pages.

3GPP, "Procedures for 5G System; Stage 2 (Release 15)", 3GPP TS 23.502 V15.4.1, Jan. 2019, 23 pages.

3GPP, "User Equipment (UE) procedures in Idle mode and RRC; Inactive state (Release 15)", 3GPP TS 38.304 V15.2.0, Dec. 2018, 28 pages.

3GPP, "Non-Access-Stratum (NAS) functions related to Mobile Station (MS) in idle mode (Release 16)", 3GPP TS 23.122 V16.1.0, Mar. 2019, 66 pages.

3GPP, "System Architecture for the 5G System; Stage 2 (Release 16)", 3GPP TS 24.501 V16.0.2, Mar. 2019, 81 pages.

3GPP, "Numbering, addressing and identification (Release 15)", 3GPP TS 23.003 V15.6.0, Dec. 2018, 126 pages.

3GPP, "System Architecture for the 5G System; Stage 2 (Release 16)", 3GPP TS 23.501 V16.0.0, Mar. 2019, 307 pages.

Nokia et al., "Revised SID: Study on NR Industrial Internet of Things (Iot)", 3GPP TSG RAN meeting #81, RP-182090, Sep. 10-13, 2018, 5 pages.

3GPP, "NR; NR and NG-RAN Overall Description; Stage 2 (Release 15)", 3GPP TS 38.300 V15.4.0, Dec. 2018, 97 pages.

3GPP, "Radio Resource Control (RRC) protocol specification (Release 15)", 3GPP TS 38.331 V15.3.0, Sep. 2018, 445 pages.

Holma et al., "LTE for UMTS OFDMA and SC-FDMA based radio access", John Wiley and Sons, 2009, 232 pages.

3GPP, "Evolved Universal Terrestrial Radio Access (E-UTRA) and Evolved Universal Terrestrial Radio Access Network (E-UTRAN); Overall description; Stage 2 (Release 14)", 3GPP TS 36.300 V14.8.0, Sep. 2018, 331 pages.

RAN2, "LS on CSG cell identification", 3GPP TSG-RAN WG 2 meeting #62, R2-082899, May 5-9, 2008, 2 pages.

Nokia Siemens Network, "Definition of Hybrid Cells", 3GPP TSG-GERAN WG Meeting #46, GP-101019, May 17-21, 2010, 7 pages.

China Telecom, "Motivation for new WI Proposal on NPN support for NR", 3GPP TSG RAN Meeting #83, RP-190250, Mar. 18-21, 2019, 3 pages.

* cited by examiner

COMMUNICATIONS DEVICE, INFRASTRUCTURE EQUIPMENT AND METHODS FOR CONTROLLING CELL RESELECTION OF NON-PUBLIC-NETWORK CELLS

CROSS-REFERENCE TO RELATED APPLICATIONS

The present application is based on PCT filing PCT/EP2020/062039, filed Apr. 30, 2020, which claims priority to EP 19179812.3, filed Jun. 12, 2019, the entire contents of each are incorporated herein by reference.

BACKGROUND

Field

The present disclosure relates to communications devices, infrastructure equipment and methods of receiving downlink data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new Radio Access Technology (RAT) systems [1], as well as future iterations/releases of existing systems, to efficiently support connectivity for a wide range of devices associated with different applications and different characteristic data traffic profiles.

One aspect which may be considered for wireless communications networks and communications devices for 5G/NR technology is an arrangement in which the wireless communications network is divided into a public network part and a non-public network part. Access of the communications devices to the non-public network part may be restricted to certain types of communications devices or to a controlled group of communications devices. A technical challenge can therefore be created in arranging for access to the different types of communications devices to the different network parts.

SUMMARY

The present disclosure can help address or mitigate at least some of the issues discussed above. Embodiments of the present technique can provide a method of selecting a cell by a communications device in a wireless communications network. The method comprises receiving from the wireless communications network an indication of a range of physical cell identifiers associated with one or more cells belonging to one or more non-public networks which form part of the wireless communications network which also includes public network cells, detecting signals received from a serving cell and signals received from one or more candidate cells in order to determine whether to remain attached to a currently serving cell or to reselect one of the candidate cells according to a cell reselection procedure when in an idle mode in which the communications device is not transmitting data to or receiving data from the wireless communications network. The method further comprises, selecting one of the candidate cells, based on the signals received from the serving cell and the one or more candidate cells, detecting a physical cell identifier of the selected candidate cell, determining whether the physical cell identifier is within the range of physical cell identifiers received from the wireless communications network, and either attaching to the selected candidate cell, or rejecting the selected candidate cell depending on whether the communications device is configured to attach to one or more of the non-public networks or not.

Embodiments of the present technique can also provide a method of selecting a cell by a communications device in a wireless communications network. The method comprises detecting, when in an idle mode, signals received from a serving cell and signals received from one or more candidate cells in order to determine whether to remain attached to a currently serving cell or to reselect one of the candidate cells according to a cell reselection procedure, the idle mode being a mode in which the communications device is not transmitting data to or receiving data from the wireless communications network. The method comprises selecting, based on the signals received from the serving cell and the one or more candidate cells, one of the candidate cells, the selected candidate cell being a cell belonging to a non-public network. The selecting the candidate cell to which the communications should attach for transmitting data to or receiving data from the non-public network comprises receiving system information broadcast from the selected candidate cell, detecting from a first information element from the broadcast system information, that the cell is barred to communications devices, and detecting from a second information element of the received system information whether the selected candidate cell is barred to communications devices not configured to access the non-public network and configured to access the non-public network, and either attaching to the selected candidate cell, or rejecting the selected candidate cell depending on whether the communications device is configured to attach to the non-public networks or not.

Accordingly example embodiments can provide an arrangement in which communications devices can perform a cell reselection procedure when the wireless communications network provides a mixed deployment of non-public networks and public networks.

Respective aspects and features of the present disclosure are defined in the appended claims. It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
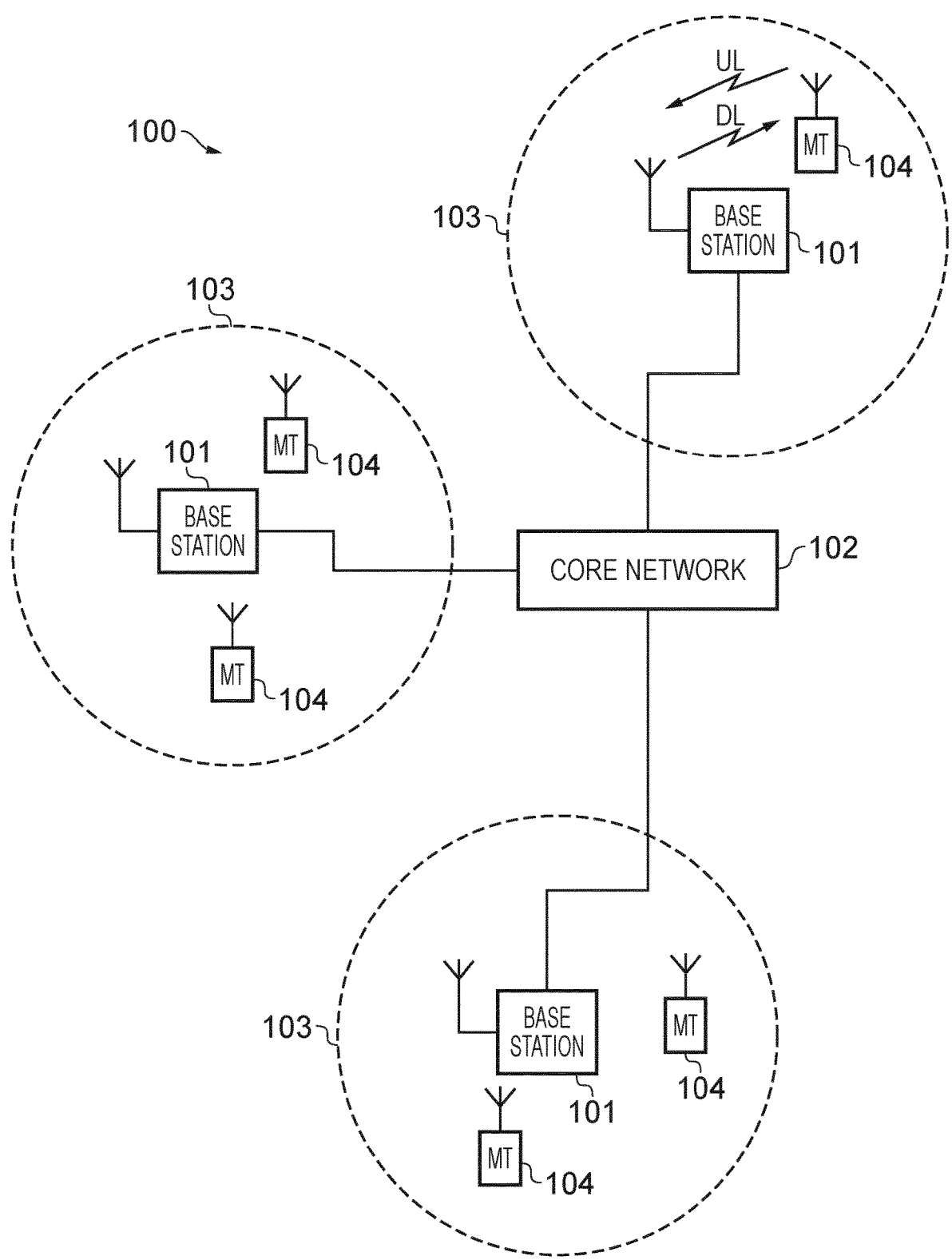
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
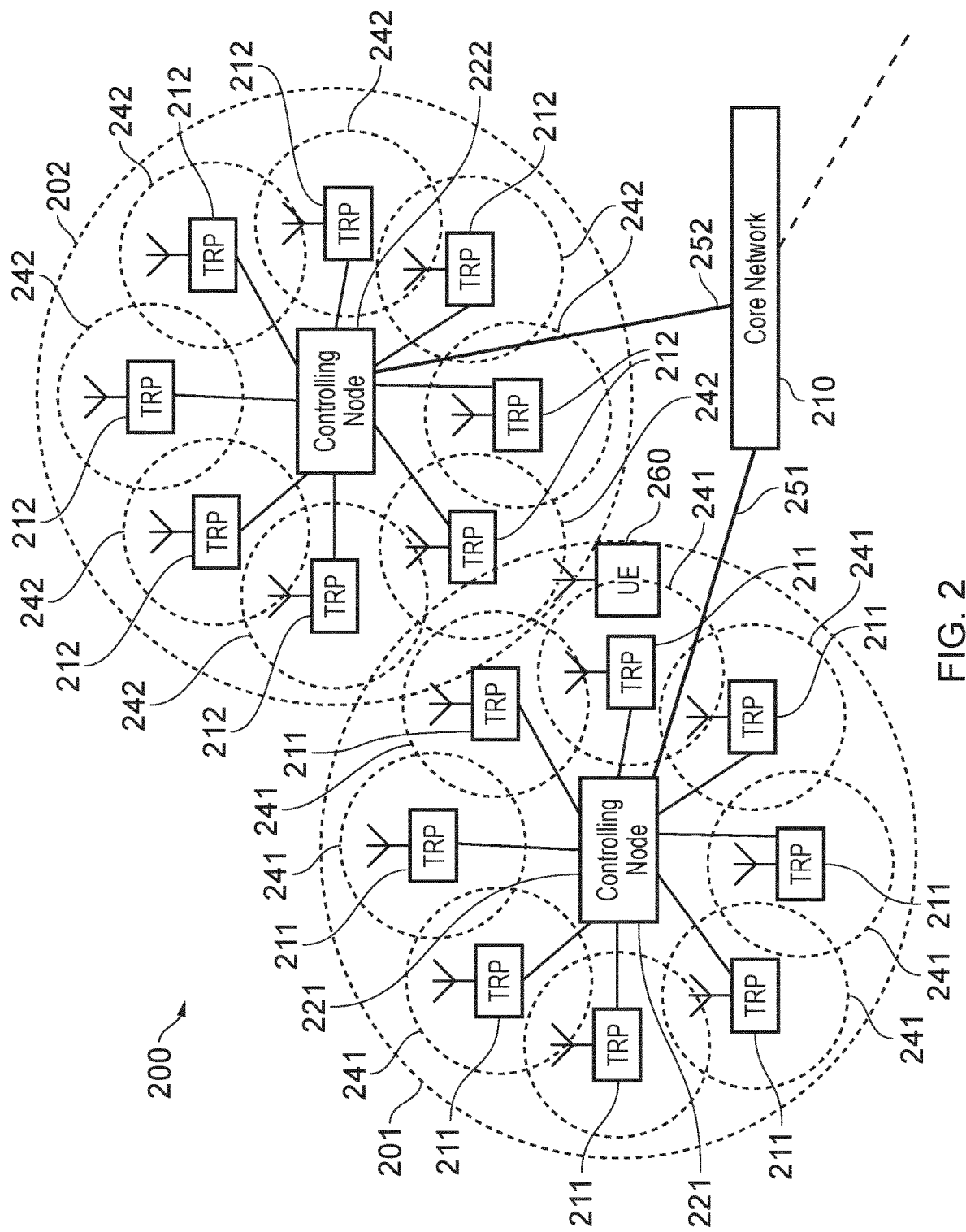
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new Radio Access Technology (RAT) wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communications cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202.

Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
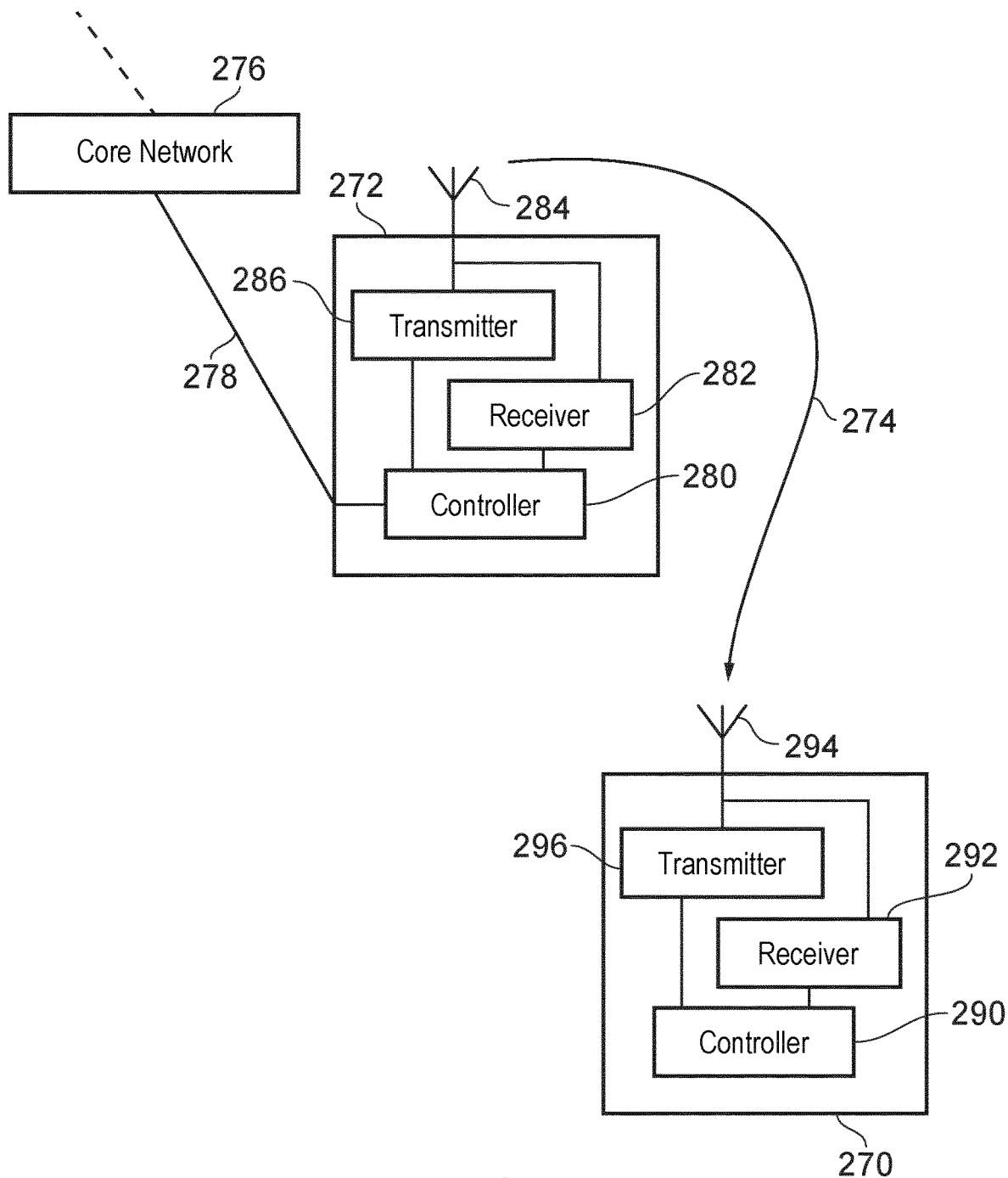
FIG. 3 is a schematic block diagram of an example infrastructure equipment and communications device which may be configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to receive downlink data from the infrastructure equipment 272 via resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

Cell Reselection

Cell reselection generally refers to a process whereby the communications device changes its serving cell to a new cell, the new cell having been selected by the communications device. Unlike a handover procedure, which is typically directed by a wireless communications network, cell reselection can occur while the communications device is in an idle or an INACTIVE mode, not having an active RRC connection in the serving cell.

The process of cell reselection may be specified in standards specification, and may be in accordance with predetermined parameters configured by the wireless communications network. Broadly, the key steps in the process of cell reselection may be summarised as follows:

1. The communications device makes measurements of signals received in the serving cell and/or of signals transmitted in other cells. These measurements may comprise measurements of signal strength and/or of signal quality (e.g. signal to noise+interference ratio). This step may be repeated periodically to determine whether conditions are satisfied which suggest that the current serving cell may soon be no longer suitable as a serving cell.
2. The communications device may be able to identify at this stage that a cell is not a candidate for reselection. For example, an identity parameter (such as a physical cell identifier) may be encoded within one or more synchronisation signals which the communications device knows, based on for example a configuration by the serving wireless communications network corresponds to a not permitted cell.
3. If conditions for cell reselection relating to the signal strength measurements are satisfied in respect of a candidate cell, the communications device attempts to receive and decode broadcast system information relating to the cell.
4. The system information may provide additional parameters defining criteria which must be satisfied. These may be identity parameters (such as a public land mobile network (PLMN) ID), signal strength/quality parameters, and barring parameters. For example, in 3GPP Release 15 5G/NR, a master information block (MIB) may comprise a binary indicator cellBarred, which if set to 'barred', indicates that the communications device is not permitted to access the cell, and therefore cannot consider it as a candidate for cell reselection. Similarly, a system information block (SIB) 1 (conventionally decoded after the MIB) may comprise a boolean parameter cellReservedForOtherUse. If this parameter is set to 'true', then the communications device is required to treat the cell as barred (i.e. not permitted to be selected as a serving cell).
5. If, based on the information within the system information, all criteria for cell reselection are satisfied, then the communications device selects the candidate cell as its new serving cell. The communications device may transmit a notification in the new serving cell to notify the wireless communications network of its new serving cell, in order to ensure that downlink data and corresponding pages messages can be transmitted in the correct cell.
6. If, based on the information within the system information, all criteria for cell reselection are not satisfied, then the process may continue with step 3, in respect of another cells whose signal measurements satisfied the appropriate criteria.
7. If no candidate cell satisfies the criteria for cell reselection, then the current serving cell remains the serving cell.

Neighbour Cell Information

In order to assist the communications device in assessing only candidate cells which are permitted as serving cells for the communications device, the wireless communications network may transmit neighbour cell information.

For example, the wireless communications network may broadcast in system information of the current serving cell a list of frequencies on which permitted neighbour cells operate.

Non Public Networks

Conventionally, a goal of operators of wireless communications networks has been to provide greatest geographical coverage and/or maximum performance for all its customers, while minimising expenditure on infrastructure equipment. Accordingly, it is generally preferable that each communications device using a wireless communications network selects, as its serving cell, the most appropriate cell of those available. Restrictions by which a communications device was barred from selecting a particular cell were rarely used, other than for testing and/or other temporary operational reasons.

However, there has emerged a requirement to restrict certain cells to certain subscribers/communications devices. For example, an organisation may enter into an agreement with an operator of an existing wireless communications network, whereby the wireless communications network operator extends an existing network by deploying infrastructure equipment to generate new cells covering the organisation's premises. These cells may be restricted to communications devices associated with employees and/or equipment belonging to that organisation. These cells may be referred to as a 'non public network' (NPN). As a result of such an arrangement, the organisation may ensure that communications devices under its control are ensured of having good coverage and/or good performance in a particular area. In particular, the NPN cells may cover indoor and/or underground spaces where conventional coverage is weak or non-existent.

Non Public Networks (NPN) are therefore networks which are deployed outside of a traditional mobile operator network. There are mainly two deployment options:
  NPN deployed as a Standalone Non Public Network (SNPN)
  NPN deployed as part of an operator's network as a Non-Standalone Non Public Network (NSNPN)

Where the cells form part of an existing public network, they may be referred to as a non-standalone NPN (NSNPN). Alternatively, infrastructure equipment and corresponding cells may form a 'standalone' network, separate from an existing network. Such a standalone network may be referred to as a 'standalone non public network (SNPN). SNPNs may be assigned an identifier similar to a PLMN ID. Accordingly, a communications device may be configured to operate in a mode where it selects only an SNPN, in addition to performing conventional PLMN selection (see [3], section 5.30.2).

For NSNPN, it has been proposed that cells which are part of an NPN are associated with one or more closed access group (CAG) IDs, and that communications devices are provisioned or configured with a list of zero or more CAG IDs depending on the NPN(s) which they are allowed to access. The system information (for example, SIB1) of an NPN cell may include an indication of the cell's associated CAG ID(s). Accordingly, during the cell reselection process a communications device can evaluate whether or not it is permitted to access the cell: if the cell's system information indicates that the cell is an NPN cell, but does not indicate any CAG ID which is in a list of allowed CAG IDs of the communications device, then the communications device cannot consider the cell as a candidate serving cell.

Communications devices which are permitted access to NPN cells (i.e. are configured with one or more allowed CAG IDs) may or may not be permitted to access cells which are not NPN cells. If a communications device is configured with permission to access only cells associated with one or more specific CAG IDs, then during the cell reselection process it will consider any cell which is not an NPN cell as not valid as a candidate serving cell.

When NPN is hosted by a public network (NSNPN), the NPN could be implemented by realizing a dedicated network slice or APN (Access Point Name) for the NPN. NSNPN deployment will require a cell to broadcast an NPN identifier (ID) and a Closed Access Group (CAG) identifier (ID). For the example of an SNPN, a cell may broadcast a Public Land Mobile Network (PLMN) identifier (ID) and an NPN ID. The PLMN ID and NPN ID may not be unique in the network.

An NPN customer could also be a public network customer and such for an example in which a UE is allowed to register with both the NPN and the SNPN networks.

In order to determine whether a cell is accessible (i.e. is a valid candidate for being a serving cell), the communications device must not only have assessed measurements of signals of the cell, but also have synchronised to the cell and received and decoded system information (such as the MIB and one or more SIBs). If the communications device determines that a cell is not accessible based on MIB and/or SIB, then a significant amount of energy has already been expended in respect of a cell which must now be discounted from the cell reselection process. Conventionally, it is unlikely that a communications device would determine that a cell is not accessible based on MIB and/or SIB. However, as NPN cells (and particularly, NSNPN cells) are deployed, there is a greater likelihood that a communications device will determine that a cell is not a candidate for cell reselection only after it has received and decoded SIB1.

This may be because the candidate cell is an NPN cell which the communications device is not permitted to use, or because the candidate cell is a non-NPN cell and the communications device is permitted only to use NPN cells.

LTE & CSG Cells

In 4G/LTE, closed subscriber group (CSG) functionality has been specified, whereby a communications device can be associated with one or more allowed CSG IDs. Access to a cell may be restricted to those communications devices associated with (i.e. having in an allowed list) a CSG ID associated with the cell.

In 4G/LTE, a wireless communications network may comprise CSG cells (that is, cells not accessible to communications devices not having any allowed CSG IDs) and non-CSG cells (cells having no restriction). In order to reduce a power consumption of a communications device associated with receiving and decoding MIB/SIBs from cells which the communications device is not permitted to access the cell as a result a CSG-related restriction, the communications device may receive an indication of a range of physical cell identities (PCIs) which are reserved for CSG cells. PCI is encoded in the scrambling sequence of the PSS and SSS of LTE.

Because the PCI of a cell is encoded within synchronisation signals broadcast by the cell, it can be determined, without receiving and decoding MIB/SIB, whether a cell is or is not a CSG cell based on whether the determined PCI is within the range of PCIs reserved for CSG cells. In many scenarios, therefore, unnecessary decoding of MIB/SIB is avoided.

However, in the present specifications for 5G/NR, no such corresponding feature exists for NPN cells. In some examples a network can broadcast a list of blacklisted cells and frequencies in NR/5G which is associated with a UE behaviour, with the effect that the UE will not reselect the blacklisted cells. However, this list is applicable to all UEs including NPN and non-NPN UEs. Communications devices compliant with early versions (in particular, 3GPP Release 15) would not recognise an indication of a range of reserved cell identifiers introduced in later versions. A 3GPP Release 15-compliant communications device, having no allowed CAG ID list, would therefore continue to decode and read MIB/SIB even if a physical cell identity of the cell was within a range signalled as reserved for NPN cells.

IDLE Mode Cell Selection/Reselection of CAG Cells

According to previously proposed wireless access networks, such as those conforming to a 3GPP service agreement, a Closed Access Group (CAG) cell, which defines a cell for accessing an NPN, is configured to broadcast information such that only UEs which are supporting the CAG can access the cell. This is defined for example in TS 38.300 and TS 38.304. This configuration can be applied to either a CAG cell or a normal PLMN cell.

Figure 4:
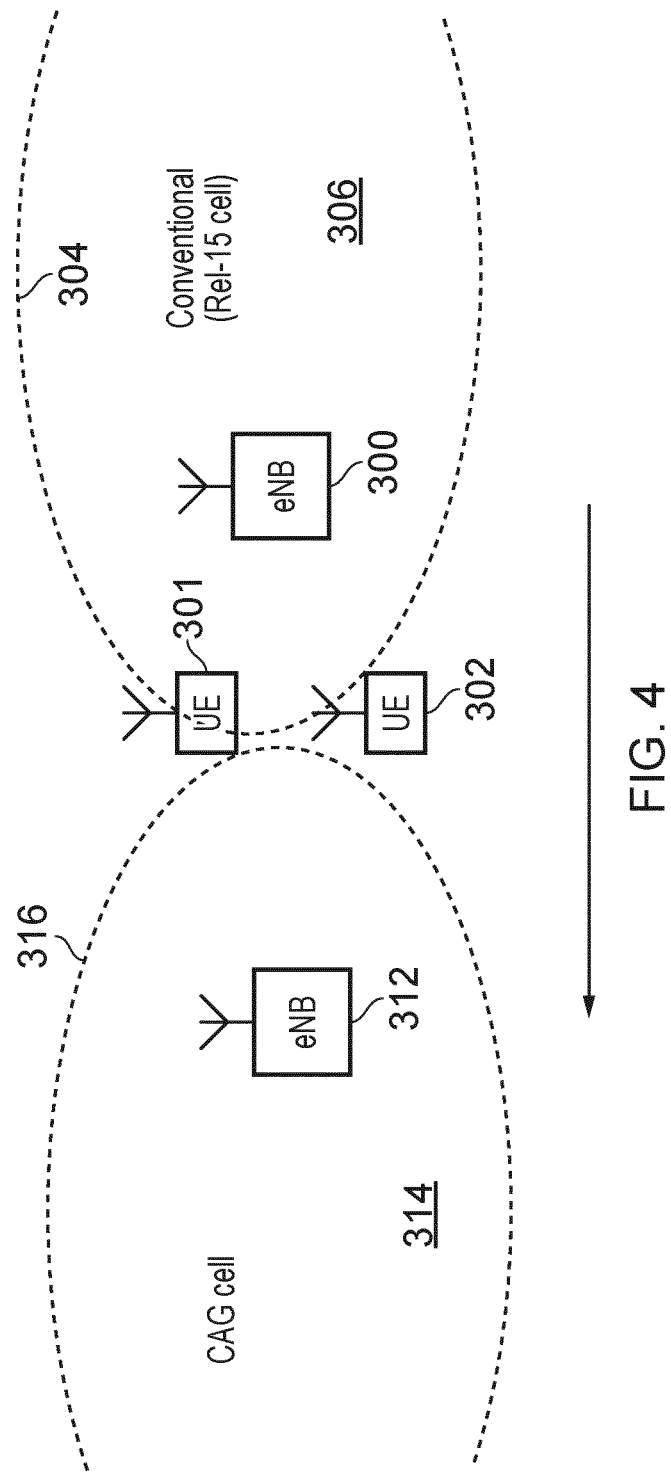
FIG. 4 is a schematic illustration of a process in which two communications devices of different types perform a cell reselection process when the cell which the communications devices select is a closed access group cell and the communications devices are configured differently.

For a CAG cell, there are two scenarios:
1. A CAG capable UE having CAG allowed list is able to select/reselect this cell
2. A conventional UE which is not enabled to recognise the CAG identifier or recognises the CAG identifier and is therefore able to avoid this cell for cell selection/reselection. An example of this arrangement is provided in FIG. 4. FIG. 4 provides an illustration of a situation in which two differently configured UEs perform a cell reselection procedure from a conventional (PLMN) cell to a cell forming part of a Closed Access Group. As shown in FIG. 4 a first eNB 300 is configured as part of a public network part of a wireless communications network and forms an PLMN cell 306 with a cell boundary 304 and provides a wireless access interface of the wireless communications network to a first UE 301 and second UE 302. As illustrated by a first dotted line 304, a boundary of a cell 306 is provided by the first UE 300 is formed within which the UEs 301, 302 can transmit and receive signals. Since both the first UE 301 and the second UE 302 are on an edge of the boundary of the cell 304 then both UE's 301, 302 perform a cell reselection procedure as a result of a direction of travel in from right to left as represented by an arrow 310. Each of the first and second UEs 301, 302 detect signals transmitted by a second eNB 312 forming a second cell 314 with a cell boundary 316 shown by a dotted line. In the scenario represented in FIG. 4, both the first and second UEs 301, 302 are able to measure a signal strength and a quality of the signals broadcast by the second eNB 312, and each determine that the broadcast signals have a greater strength and provide a greater quality than the first eNB 300.

For the scenario shown in FIG. 4, the first UE 301 is configured in accordance with a conventional standard for example in accordance with 3GPP release 15 whereas the second UE 302 is configured to access a CAG of cells which may form part of an NPN. Accordingly the first UE 301 cannot access the second cell 314 provided by the second eNB 312 because this forms part of a CAG. In contrast the second UE 302 can access the second cell 314 and so performs a reselection procedure in accordance with the greater signal strength and or quality provided by the second eNB 312 in the cell 314 to reselect the second eNB 312 forming the cell 314.

As will be appreciated from the example illustrated in FIG. 4, for a conventional non-CAG cell there are two scenarios:

1. A CAG capable UE, having CAG allowed list and permitted only to select CAG cells, is not able to reselect a non-CAG cell without any additional information being broadcasted from this cell.
2. A conventional NR/5G UE is able to reselect any cell which it recognises as a cell which is a non-CAG cell according to a cell identifier broadcast by that cell.

According to this arrangement for a CAG cell, the CAG cell will broadcast

1. A new field for a CAG identifier and/or an NPN identifier as mentioned above, and
2. A legacy field "cellReservedForOtherUse" introduced for conventional non-CAG UEs (release-15 UEs) to avoid certain cells. The legacy field is transmitted as a field in a system information block 1 (SIB1).

As will be appreciated, a CAG identifier and an NPN identifier may also be included in SIB1 partly because Cell Access related information is already present in the SIB1 and master information block (MIB) size is too restricted even though MIB currently includes a cellBarred information element (IE).

A Table below lists the handling of cellReservedForOtherUse Information Element (IE) as specified in TS 38.304 of the 3GPP standards:

---

From 38.304:
cellReservedForOtherUse (IE type: "true")
Indicated in SIB1 message. In case of multiple PLMNs indicated in SIB1, this field is common for all PLMNs
When cell status is indicated as "not barred" and "not reserved" for operator use and not "true" for other use,
- All UEs shall treat this cell as candidate during the cell selection and cell reselection procedures.
When cell status is indicated as "true" for other use,
- The UE shall treat this cell as if cell status is "barred".

---

According to the above explanation, a UE while performing cell selection/reselection, will first perform measurements, then ranking and then select a best of the detected cells and then read system information of the best cell to determine a suitability to be selected. If the best cell is not suitable then the UE reads System Information Blocks (SIB) of second best cell and so on.

If NPN and PN deployments share the same frequency and the best cell is an NPN cell then a Rel-15 NR legacy UE will not be able to recognize the NPN cell until it has read SIB1 and the Information Element (IE) "cellReservedForOtherUse". Compared to the CSG concept introduced for LTE in 3GPP Rel-8/9/10, a range of PCIs were reserved for CSG operation in a mixed deployment and this reserved range was broadcast from the wireless communications network to all UEs. A PCI range for CSG cells was also used by non-CSG UEs to avoid CSG cells. According to this arrangement non CSG UEs could bar the CSG cells at physical layer while detecting a PCI. So a technical problem exists in excluding a CSG cell before ranking to avoid unnecessary MIB/SIB1 reading. Similarly, if NPN UE is looking for NPN cell or a Rel-15 UE encounters an NPN cell on a mixed deployment, where a frequency is shared between NPN and PN cells, the same issue will exist resulting in increased battery consumption.

There is accordingly a need to reduce the power consumption associated with identifying and selecting cells suitable as new serving cells.

Embodiments can provide a method of selecting a cell by a communications device in a wireless communications network. The method comprises receiving from the wireless communications network an indication of a range of physical cell identifiers associated with one or more cells belonging to one or more non-public network which form part of the wireless communications network which also includes public network cells, detecting signals received from a serving cell and signals received from one or more candidates cells in order to determine whether to remain attached to a currently serving cell or to reselect one of the candidates cells according to a cell reselection procedure when in an idle mode in which the communications device is not transmitting data to or receiving data from the wireless communications network, selecting, based on the signals received from the serving cell and the one or more candidate cells, one of the candidate cells, detecting a physical cell identifier of the selected candidate cell, determining whether the physical cell identifier is within the range of physical cell identifiers received from the wireless communications network, and either attaching to the selected candidate cell, or rejecting the selected candidate cell depending on whether the communications device is configured to attach to one or more of the non-public networks or not.

According to example embodiments a range of PCIs are reserved exclusively for NPN cells. This can further be enhanced and more than one range of PCIs per cell/frequency could be reserved for NPN cells. Reserving a range of PCIs can help NPN UEs to filter out PN cells and only include NPN cells in a cell selection/reselection procedure. The range of PCIs can be provided for NPN in a mixed deployment and an enhanced SIB1 can be configured to include PCI range of NPN cells. An indication of the range of PCIs can be broadcast from both NPN and PN cells. The range of PCIs can be also extended for non NPN UEs. In an alternative, the range of NPN cell PCIs is included in the currently existing information element which identifies the blacklisted cells, which are included in SIB3. However, this list does not mention whether the cell is blacklisted for NPN UEs and/or PN UEs. So, a separate indication is still needed to inform UEs the relevance of this IE. Such indication might be in the SIB or provided by dedicated signalling i.e. blacklisted cell list is provided in RRC signalling. Alternatively, a whitelist of cells may be used instead, but such a whitelist needs to be assigned for use by NPN UEs.

According to these example embodiments conventional PN configured UEs (Rel-15 UEs) can be configured to read system information blocks (SIB1) broadcast by an eNB forming a cell.

According to some example embodiments therefore NPN cells operating on mixed frequency layer set a "cellbarred" Information Element in a Master Information Block (MIB) to indicate that the cell is "Barred". By doing so, all conventional (legacy Rel-15) UEs will not consider this cell as a candidate for cell selection/reselection based on the MIB broadcast by the cell, which is collocated with Synchronisation Signal Block (SSB). The SSB is used to perform cell quality measurements. So no additional effort will be required for conventional/legacy UEs to bar the UE from an NPN cell. However, NPN UEs, may also consider that the cell is barred because when the MIB Information Element (IE) is read, it will indicate that this NPN cell is barred as the conventional/legacy (Rel-15 UEs) consider the cell is barred based on "cellbarred" IE in the MIB. NPN UEs are therefore configured according to example embodiments to read a new Information Element transmitted as part of the System Information Block (SIB1) or higher SIB, which indicates whether or not NPN UEs are also barred for NPN UEs. For these example embodiments a CAG cell identifier may not be broadcast, because access to the cell by an NPN UE can be determined based on the new IE of SIB1.

Alternatively, an indication that the cell is an NPN cell could be added to the MIB for NPN cells. This is detected by NPN UEs and used to select/reselect the cell. It will also assist in new non-NPN UEs to exclude this cell from cell selection/reselection by simply reading the MIB. However, conventional/legacy UEs (Rel-15 NR UEs) will not recognise the new IE in the MIB added in a later release so this arrangement is applicable where only UEs able to recognise this IE are deployed.

According to these example embodiments therefore:

An enhanced SIB1 can include a new cellBarred IE applicable to NPN UEs. NPN UEs are configured to check this CellBarred IE in the MIB first and then, after checking the MIB, if the UE detects from the CellBarred IE that the cell is barred, the UE then checks this new SIB1 IE to determine if the cell is actually barred for NPN UE. As such the CellBarred IE in the MIB is used to bar conventional/legacy UEs and non NPN UEs.

An indication in the MIB is included which indicates that the cell is a NPN cell. This indication can be used by NPN UEs and non-NPN UEs to make cell reselection easier. However, conventional/legacy UEs may not recognise this new IE but can bar the cell based on existing CellBarred IE in the MIB, if set to Barred. This handling may also apply to non-NON UEs. NPN UE will ignore CellBarred IE in MIB and rely on new indication in MIB. But if NPN cell is barred then a new IE is needed in SIB1 or higher SIB.

Figure 5:
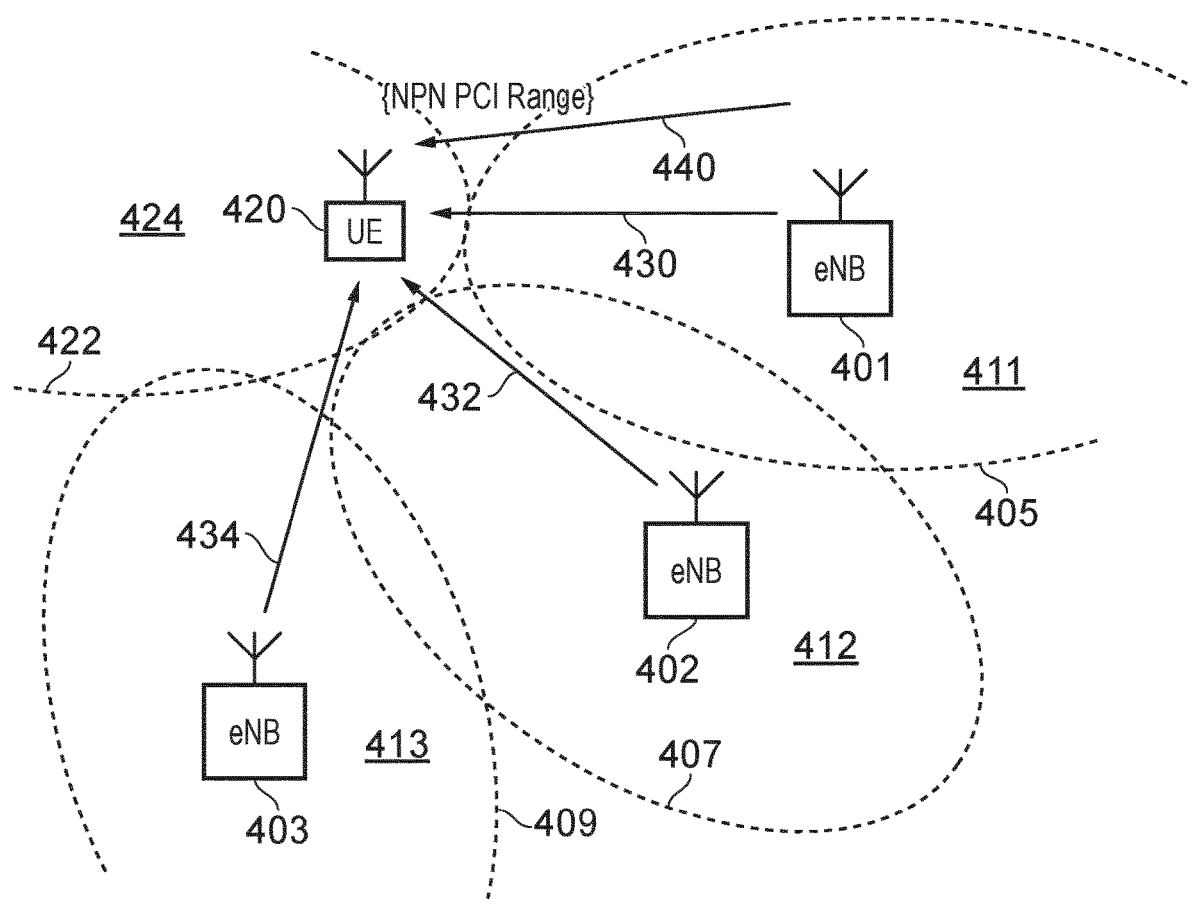
FIG. 5 is a schematic illustration of a process in which a communications device performs a cell reselection process according to the present technique.

An illustration of example embodiments is presented in FIG. 5 in which three eNBs 401, 402, 403 each form respective neighbouring cells 411, 412, 413 of a wireless communications network with cell boundaries 405, 407, 409. As shown in FIG. 5 a UE 420 is at the edge of the boundaries 405, 407, 409 of the neighbouring cells 411, 412, 413 and a boundary 422 of a currently serving cell 424. The UE 420 is configured to detect signals broadcast by each of the eNBs 401, 402, 403, which are represented by arrows 430, 432, 434. The UE 420 detects the broadcast signals 430, 432, 434 and determines a relative signal strength and quality of signals received from each of these eNBs 401, 402, 403 compared with a strength and quality of signals received within the currently serving cell 424. The UE 420 then performs a reselection procedure according to predetermined criteria in which it selects one of these eNBs 401, 402, 403 to which it should attach for transmitting and/or receiving signals via the wireless communications network or to remain on its currently serving cell.

Separately from the measurement of the signal strength and quality of signals received from the eNB 401, 402, 403, the UE 420 receives from the wireless communications network an indication of a Physical Channel Identifier (PCI) range for NPN cells which are deployed as part of the wireless communications network. This can be received via different forms of signalling from different entities, but in the example shown in FIG. 5, the indication is transmitted by the wireless communications network as represented by an arrow 440. The UE 420 is therefore configured in accordance with an example embodiment after receiving the PCI range to determine a PCI of each of the cells 411, 412, 413 formed respectively by the eNBs 401, 402, 403 to determine whether or not the UE 420 can select one of these cells 411, 412, 413. An example operation performed by the UE 420 to select one of these neighbouring cells 411, 412, 413 dependent on the Physical Channel Identifier (PCI) transmitted by the broadcast signals 430, 432, 434 of these three neighbouring cells 411, 412, 413 is shown in FIG. 6.

Figure 6:
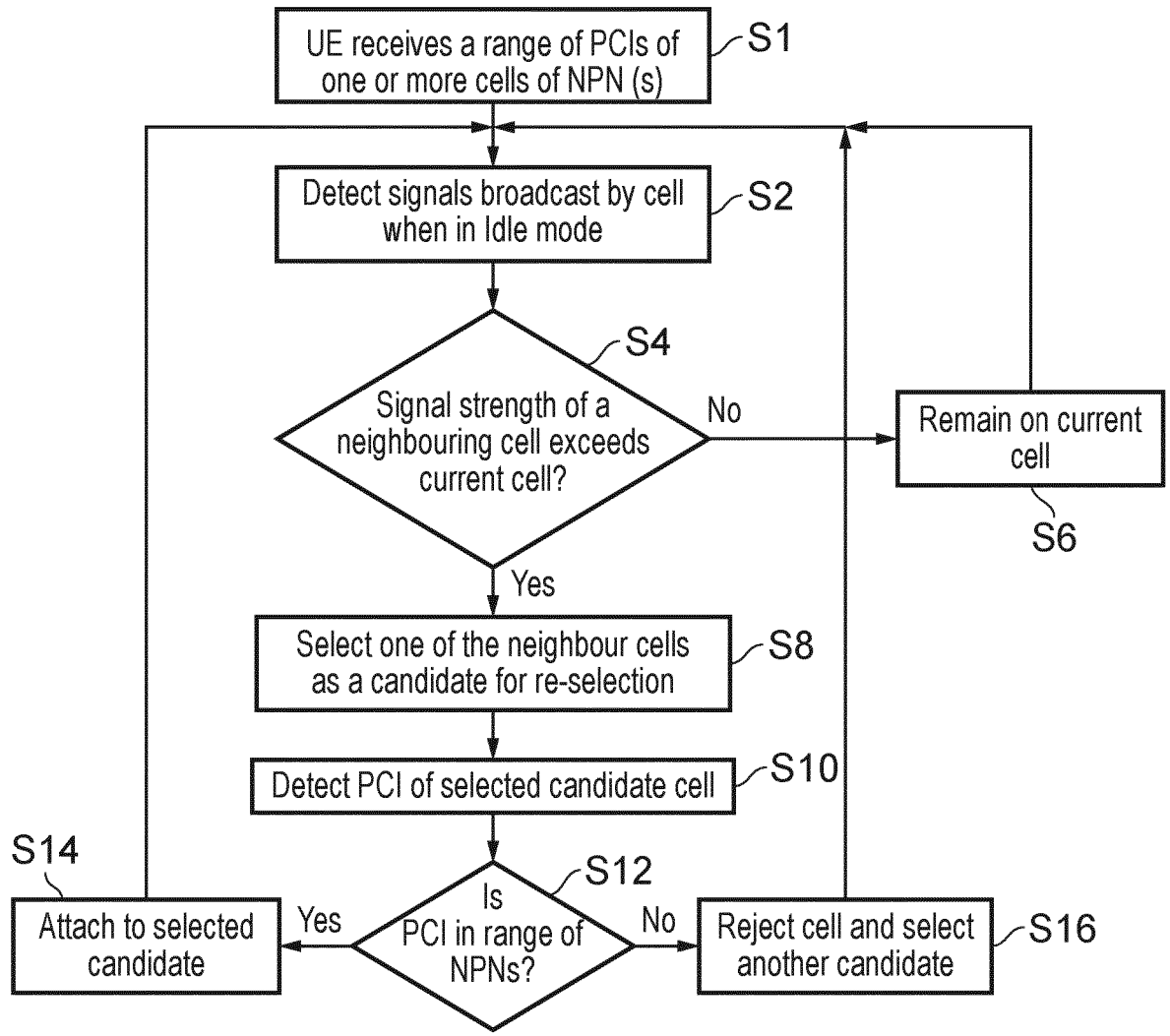
FIG. 6 is a flow diagram illustrating an example reselection procedure according to an example embodiment of the present technique.

FIG. 6 provides a summary operation of an example embodiment in which an NPN UE 420 selects a cell based on a range of PCIs which have been allocated for NPNs by the wireless communications network. FIG. 6 is summarized as follows:

S1: At some point during attachment to the wireless communications network perhaps on initial configuration or context establishment via Radio Resource Control (RRC) signalling, the UE 420 receives 440 from the wireless communications network a range of PCIs of one or more NPNs which are present in the wireless communications network. The wireless communications network may also include other cells which form publicly accessible parts (PN) of the wireless communications network.

S2: The UE 420 then performs a reselection procedure when it is in an idle mode and measures signals which are broadcast by each of the eNB 411, 412, 413 and detectable by the UE 420 in accordance with a conventional arrangement.

S4: At decision point S4, the UE 420 determines whether a strength of signals received from a neighbouring cell or a quality of the signals received from a neighbouring cell 411, 412, 413 exceed those of the current cell 424. If not then processing proceeds to step S6 and UE remains on the current cell 424 or according to behaviour already specified when no cell satisfy the criteria. However if the signal strength or quality of signals received from a neighbouring cell exceeds those of a current cell then in accordance with predetermined conditions the UE 420 proceeds to step S8 in which it selects one of these neighbouring cells 411, 412, 413 to be a candidate for reselection.

S10: The UE 420 then detects a PCI of the selected candidate cell and compares this PCI with the range of PCIs corresponding to the one or more NPNs deployed in the current wireless communications network received from the wireless communications network 440.

S12: At decision point S12 the UE 420 determines whether or not the detected PCI of the selected candidate cell 411, 412, 413 is within the range of PCIs for the NPN cells and proceeds to step S14 if the PCI is within the range of NPNs. According to step S14 the UE 420 selects the candidate cell to which it should attach in accordance with its cell reselection procedure. If not, if the PCI is not within the range of the PCIs for the NPNs, then at step S16 the UE rejects the cell as a candidate and proceeds again to detect the signals broadcast from neighbouring cells 411, 412, 413 when in the idle mode having remained on the current cell.

According to another example embodiment the UE 420 can detect System Information Blocks (SIB) broadcast by a candidate cell 411, 412, 413 to determine whether or not it can attach to this cell if it is configured to attach to an NPN.

Figure 7:
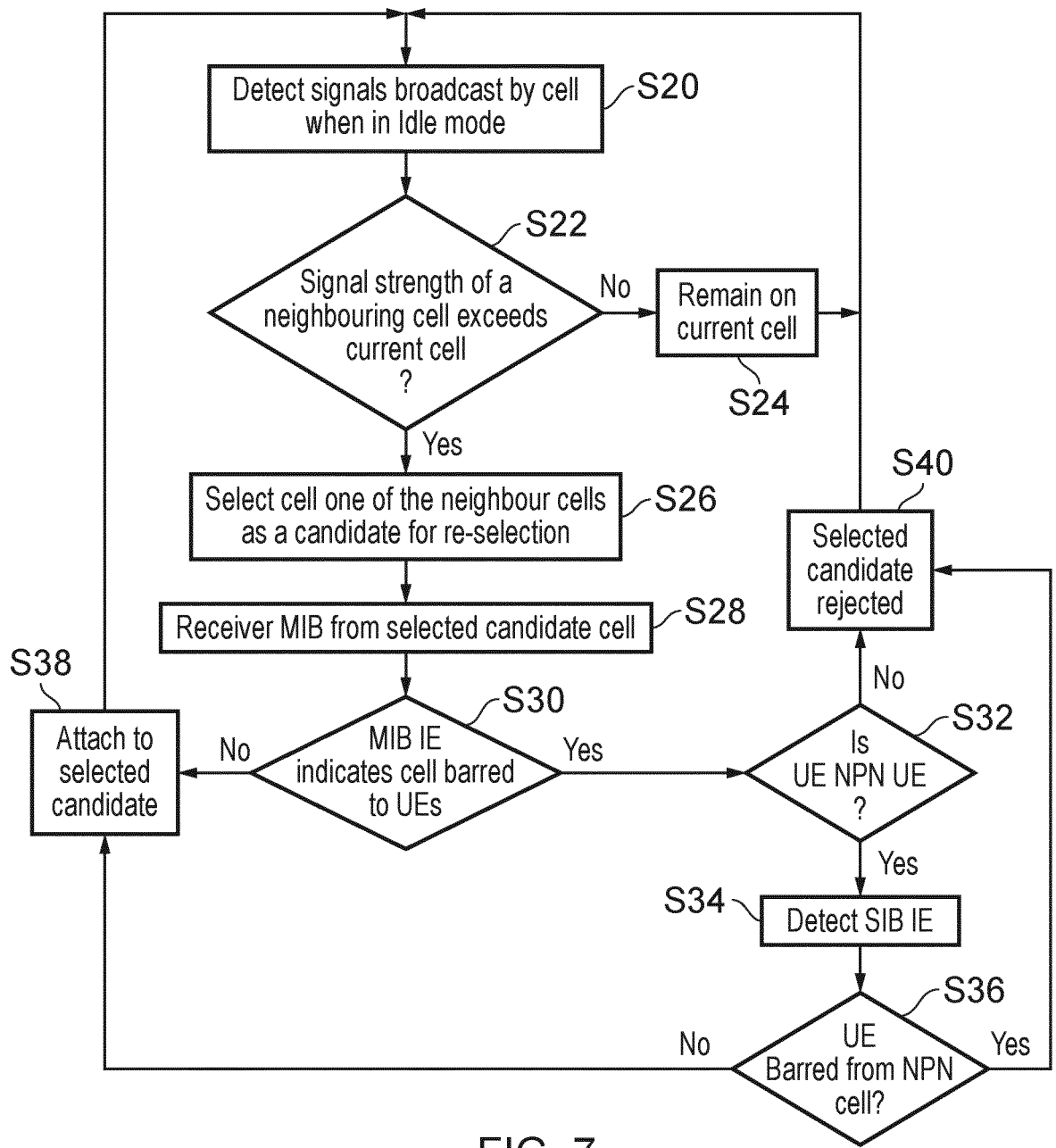
FIG. 7 is a flow diagram illustrating an example reselection procedure according to an example embodiment of the present technique.

An example illustration of this embodiments is provided in FIG. 7, which is summarized as follows:

S20: In step S20 the UE 420 detects the signals broadcast by one or more of the neighbouring cells 411, 412, 413 when it is in an idle mode in accordance with a cell reselection procedure which corresponds to step S2 of FIG. 6. At decision point S22, the UE 420 determines whether a signal strength of signals 430, 432, 434 broadcast by a neighbouring cell or the quality of the signals 430, 432, 434 received from a neighbouring cell 411, 412, 413 exceeds that of a current cell 424. If the strength or quality of the signals 430, 432, 434 received from a neighbouring cell 411, 412, 413 does not exceed that of the current cell 424 then processing proceeds to step S24 which corresponds to step S6 of FIG. 6 in which the UE remains on the current cell, otherwise processing proceeds to step S26.

At steps S26 if the signal strength or quality of the signals 430, 432, 434 received from a neighbouring cell 411, 412, 413 exceed that of the current cell 424 then the UE 420 selects one of the neighbouring cells 411, 412, 413 as a candidate for reselection. At step S28 the UE 420 detects a Master Information Block (MIB) 430, 432, 434 from the selected candidate cell 411, 412, 413 and, in one example, identifies from an Information Element of the MIB whether the selected candidate cell is either for conventional UEs or non NPN UEs.

S30: At decision point S30, the UE 420 determines whether the information element of the MIB indicates that it is barred to UEs or not. If the UE is barred then processing proceeds to step S32.

At decision point S32 having identified from the information element of the MIB that the cell is barred to UEs, the UE proceeds to determine whether or not it is configured to operate with NPNs. If it is then at process step S34 the UE detects the System Information Block (SIB) transmitted from the eNB 401, 402, 403 of the select candidate cell and identifies an information element indicating whether or not the cell is barred to NPN UEs. At decision point S36 the UE detects from the information element of the SIB whether it is barred from the cell 411, 412, 413 the cell being an NPN cell. If it is not barred then processing proceeds to step S38 and the UE attaches to the select candidate cell. If the UE 420 is barred from the selected candidate cell then at step S40 the UE 420 rejects the current cell and proceeds back to step S20 to detect signals transmitted by neighbouring cells.

According to the present technique therefore a UE can more efficiently detect whether or not it can access a cell forming part of a wireless communications network which includes both NPNs and non NPN parts. This is achieved by either detecting the PCI of the cell having previously received a range of PCI values which it can accept or detects information elements transmitted in system information blocks transmitted by the eNB forming the cell.

Redirection Information

According to some example embodiments the UE may be configured to receive from the wireless communications network an indication of redirection information. The redirection information may be received as part of Radio Resource Control (RRC) signalling. The redirection information can include one or more of PCIs which the UE should select as candidates for selection. As discussed above, a range of NPN cell PCIs (or blacklisted or whitelisted cells) could be included in the redirection information, which can provide an advantage because a UE specific list can be provided compared to a broadcast list which is applicable to all UEs in the cell (i.e. broadcasted list is for both NPN and non-NPN UEs). According to some example embodiments therefore redirection information can be provided using RRC signalling which is specific to a UE which can include blacklisted cells and whitelisted cells for a particular UE. The network can therefore decide, based on a UE subscription and/or a UE's capability an allowed CAG list etc. The UE can therefore ignore the list received via broadcast signalling.

Embodiments can therefore provide method of selecting a cell by a communications device in a wireless communications network, the method comprising receiving from the wireless communications network an indication of one or more cells belonging to one or more non-public networks which form part of the wireless communications network which also includes public network cells, detecting, when in a first mode, signals received from a serving cell and signals received from one or more candidate cells in order to determine whether to reselect one of the candidate cells according to a cell reselection procedure, the first mode being a mode in which the communications device is not transmitting data to or receiving data from the wireless communications network. The method further comprising selecting, based on the signals received from the serving cell and the one or more candidate cells, one of the candidate cells, determining whether the selected candidate cell can be accessed or not, and either attaching to the selected candidate cell, or rejecting the selected candidate cell depending on whether the communications device is configured to attach to one or more of the non-public networks or not, wherein the indication of the one or more cells belonging to one or more non-public networks is provided to the communications device using radio resource control signalling, the range of the physical cell identifiers being specific to the communications device.

If cells belonging to one or more NPNs are identified by a PCI range then, the redirection information can be provided as part of an RRC Release message, and can also be enhanced to include new information. For an example in which PCIs are reserved for the one or more NPNs and the PCI range is also broadcasted, then the RRC signalling can be used to include a subset of one or more PCIs or a PCI range in redirection information which is specific to this UE. This redirection information can be selected by the network with a particular PCI or range for a particular UE either based on subscription (MRL in the gNB) or location (historically, single PCI existed in the neighbourhood).

A table below presents a current structure of redirectedCarrierInfo IE included in RRCRelease message:

```
RedirectedCarrierInfo ::=              CHOICE {
    nr                                     CarrierInfoNR,
    eutra
RedirectedCarrierInfo-EUTRA,
    ...
}
RedirectedCarrierInfo-EUTRA ::=        SEQUENCE {
    eutraFrequency                         ARFCN-ValueEUTRA,
    cnType                                 ENUMERATED
{epc,fiveGC}
OPTIONAL -- Need N
}
CarrierInfoNR ::=                      SEQUENCE {
    carrierFreq                            ARFCN-ValueNR,
    ssbSubcarrierSpacing                   SubcarrierSpacing,
    smtc                                   SSB-MTC
OPTIONAL, -- Need S
    ...
}
```

Following new information can be included in carrier info:
- Dedicated PCI/PCI range (subset of broadcasted range) per UE for selecting an NPN cell or NPN cells in a shared frequency. This may include whitelist and blacklist cells. The UE will then ignore the list received from broadcast.
- Allowed CAG list; this is to cover a scenario where gNB received an updated Mobility Restriction List from AMF and UE may not have received it via NAS signaling because RRCRelease has been triggered. It is secure because RRCRelease is security protected.
- Update NPN ID, NPN PLMN list; same reason as above.

Automatic Neighbour Report

According to some example embodiments, a UE can be configured to transmit to the wireless communications network an Automatic Neighbour Report (ANR), which indicates one or more identifiers of the one or more NPNs which neighbour a currently selected cell. In general, an ANR report can be enhanced to report CAG identifier, an NPN identifier, as well as an NPN PLMN identifier, which is currently reported. An NPN cell broadcasted slice identifier can also be included as part of the ANR. The network can take this information into account while handing over the UE to a neighbouring cell. For example, and the network can determine whether current services/configuration of the UE in the serving cell can be supported by the neighbouring cell. If for example the neighbouring cell is not an NPN cell, then a source node of the network may decide not to handover to such a cell as HO target for an NPN UE. Similar handling for slice ID and CAG ID can be made with network receiving this information via ANR report sent by the UE. It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of selecting a cell by a communications device in a wireless communications network, the method comprising
- receiving from the wireless communications network an indication of a range of physical cell identifiers associated with one or more cells belonging to one or more non-public networks which form part of the wireless communications network which also includes public network cells,
- detecting signals received from a serving cell and signals received from one or more candidate cells in order to determine whether to reselect one of the candidate cells according to a cell reselection procedure when in a mode in which the communications device is not transmitting data to or receiving data from the wireless communications network,
- selecting, based on the signals received from the serving cell and the one or more candidate cells, one of the candidate cells,
- detecting a physical cell identifier of the selected candidate cell,
- determining whether the physical cell identifier is within the range of physical cell identifiers received from the wireless communications network, and either
- attaching to the selected candidate cell, or rejecting the selected candidate cell depending on whether the communications device is configured to attach to one or more of the non-public networks or not.

Paragraph 2. The method of paragraph 1, wherein the communications device is configured to transmit data to or to receive data from the public network cells of the wireless communication network and not the non-public cells, and the determining whether the physical cell identifier is within the range of physical cell identifiers received from the wireless communications network, comprises
 determining that the physical cell identifier is within the range of the physical cell identifiers of the cells of the non-public networks,
 rejecting the selected candidate cell, and
 selecting another candidate cell.

Paragraph 3. The method of paragraph 2, the method comprising
 determining that the physical cell identifier is not within the range of the physical cell identifiers of the cells of the non-public networks, the selected candidate being a cell of the public network part, and
 selecting the candidate cell to which the communications should attach.

Paragraph 4. The method of paragraph 1, wherein the communications device is configured to transmit data to and to receive data from the cells of one or more of the non-public networks of the wireless communication network, and the determining whether the physical cell identifier is within the range of physical cell identifiers received from the wireless communications network comprises
 determining that the physical cell identifier is within the range of the physical cell identifiers of the cells of the non-public networks, and
 selecting the candidate cell to which the communications should attach for transmitting data to or receiving data from the non-public network.

Paragraph 5. The method of paragraph 4, the method comprising
 determining that the physical cell identifier is not within the range of the physical cell identifiers of the cells of the non-public networks, the selected candidate being a cell of the public network part, and
 rejecting the selected candidate cell, and
 selecting another candidate cell.

Paragraph 6. The method of any of paragraphs 1 to 5, comprising
 receiving from the wireless communications network an indication of redirection information, the redirection information including one or more of physical cell identifiers which the communications device should select as a candidate for selection if the selected candidate cell is rejected by the communications device.

Paragraph 7. The method of paragraph 6, wherein the indication of the redirection information is received from the wireless communications network as part of a radio resource control signalling.

Paragraph 8. The method of paragraph 6 or 7, wherein the one or more of physical cell identifiers of the redirection information identify cells with a shared frequency of a wireless access interface provided by the wireless communications network.

Paragraph 9. The method of paragraph 6, 7 or 8, wherein the redirection information includes a list of closed access group which can be accessed by the communications device.

Paragraph 10. The method of any of paragraphs 6 to 9, wherein the redirection information includes an update of the range of physical cell identifiers associated with the one or more cells belonging to one or more non-public network which was received from the wireless communications network.

Paragraph 11. The method of paragraphs 6 to 10, wherein the redirection information includes a range of non-public network cell physical cell identifiers which the UE is allowed to access.

Paragraph 12. The method of paragraphs 6 to 10, wherein the redirection information includes a range of non-public network cell physical cell identifiers which the UE is not allowed to access.

Paragraph 13. The method of paragraphs 11 or 12, wherein the redirection information is specific to the communications device.

Paragraph 14. A method of selecting a cell by a communications device in a wireless communications network, the method comprising
 detecting signals received from a serving cell and signals received from one or more candidate cells in order to reselect one of the candidate cells according to a cell reselection procedure when in a mode in which the communications device is not transmitting data to or receiving data from the wireless communications network,
 selecting, based on the signals received from the serving cell and the one or more candidate cells, one of the candidate cells, wherein the selected candidate cell is a cell belonging to a non-public network, and the selecting the candidate cell to which the communications should attach for transmitting data to or receiving data from the non-public network comprises
 receiving system information broadcast from the selected candidate cell,
 detecting from a first information element from the broadcast system information, that the cell is barred to communications devices, and
 detecting from a second information element of the received system information whether the selected candidate cell is barred to communications devices not configured to access the non-public network and configured to access the non-public network, and either
 attaching to the selected candidate cell, or rejecting the selected candidate cell depending on whether the communications device is configured to attach to the non-public networks or not.

Paragraph 15. The method of paragraph 14, wherein the communications device is configured to transmit data to and to receive data from the cells of one or more of the non-public networks of the wireless communication network, the attaching to the selected candidate cell comprises
 selecting the candidate cell to which the communications should attach for transmitting data to or receiving data from the non-public network.

Paragraph 16. The method of paragraph 15, wherein the first information element forms part of a master information block transmitted for detection first by the communications device, and the second information element forms part of a system information block received after the master information block.

Paragraph 17. The method of paragraph 16, comprising
 declaring that a candidate cell is barred based on the indication provided by either the first or the second information elements.

Paragraph 18. The method of any of paragraphs 16 or 17, wherein the master information block includes an indication that the selected candidate cell belongs to a non-public network.

Paragraph 19. The method of any of paragraphs 1 to 14, comprising
transmitting to the wireless communications network an automatic neighbour report indicating one or more identifiers of the one or more non-public networks which neighbour the currently selected cell.

Paragraph 20. The method of paragraph 19, wherein the automatic neighbour report includes an indication of closed access group identifiers and/or an identifier of a network slice which neighbours the currently selected cell.

Paragraph 21. A method of selecting a cell by a communications device in a wireless communications network, the method comprising
receiving from the wireless communications network an indication of one or more cells belonging to one or more non-public networks which form part of the wireless communications network which also includes public network cells,
detecting signals received from a serving cell and signals received from one or more candidate cells in order to determine whether to reselect one of the candidate cells according to a cell reselection procedure when in a mode in which the communications device is not transmitting data to or receiving data from the wireless communications network,
selecting, based on the signals received from the serving cell and the one or more candidate cells, one of the candidate cells,
determining whether the selected candidate cell can be accessed or not, and either
attaching to the selected candidate cell, or rejecting the selected candidate cell depending on whether the communications device is configured to attach to one or more of the non-public networks or not, wherein the indication of the one or more cells belonging to one or more non-public networks is provided to the communications device using radio resource control signalling, the range of the physical cell identifiers being specific to the communications device.

Paragraph 22. The method of paragraph 21, wherein the redirection information includes a range of non-public network cell physical cell identifiers which the UE is allowed to access, the redirection information being a whitelist.

Paragraph 23. The method of paragraph 21, wherein the redirection information includes a range of non-public network cell physical cell identifiers which the UE is not allowed to access, the redirection information being a blacklist.

Paragraph 24. The method of paragraphs 22 or 23, comprising
receiving a list of physical cell identifiers broadcast by the wireless communications network, the list of physical cell identifiers identifying whether a cell is a non-public cell, and
ignoring the list of the physical cell identifiers broadcast by the wireless communications network in favour of the indication of the one or more cell belonging to the non-public networks received using the radio resource signalling, which is specific to the communications device.

Paragraph 25. The method of any of paragraphs 1 to 24, wherein the first mode is an idle or inactive mode, and a second mode is a mode in which the communications device transmits or receives data.

Paragraph 26. A communications device for receiving data from a wireless communications network, the communications device comprising
receiver circuitry configured to receive signals transmitted via a wireless access interface provided by the wireless communications network,
transmitter circuitry configured to transmit signals via the wireless access interface, and
controller circuitry configured to control the receiver circuitry
to receive from the wireless communications network an indication of a range of physical cell identifiers associated with one or more cells belonging to one or more non-public network which form part of the wireless communications network which also includes public network cells,
to detect signals received from a serving cell and signals received from one or more candidates cells in order to reselect one of the candidates cells according to a cell reselection procedure when in a mode in which the communications device is not transmitting data to or receiving data from the wireless communications network,
to select, based on the signals received from the serving cell and the one or more candidate cells, one of the candidate cells,
to detect a physical cell identifier of the selected candidate cell,
to determine whether the physical cell identifier is within the range of physical cell identifiers received from the wireless communications network, and either
to attach to the selected candidate cell, or to reject the selected candidate cell depending on whether the communications device is configured to attach to one or more of the non-public networks or not.

Paragraph 27. The communications device of paragraph 26, wherein the controller circuitry is configured with the receiver circuitry
to transmit data to or to receive data from the public network cells of the wireless communication network and not the non-public cells, and
to determine whether the physical cell identifier is within the range of physical cell identifiers received from the wireless communications network, by determining that the physical cell identifier is within the range of the physical cell identifiers of the cells of the non-public networks, rejecting the selected candidate cell, and selecting another candidate cell.

Paragraph 28. A communications device for receiving data from a wireless communications network, the communications device comprising
receiver circuitry configured to receive signals transmitted via a wireless access interface provided by the wireless communications network,
transmitter circuitry configured to transmit signals via the wireless access interface, and
controller circuitry configured to control the receiver circuitry
to detect signals received from a serving cell and signals received from one or more candidate cells in order to reselect one of the candidate cells according to a cell reselection procedure when in a mode in which the communications device is not transmitting data to or receiving data from the wireless communications network,
to select, based on the signals received from the serving cell and the one or more candidate cells, one of the candidate cells, wherein the selected candidate cell is a cell belonging to a non-public network, and the selecting the candidate cell to which the communications should attach for transmitting data to or receiving data from the non-public network comprises to receive system information broadcast from the selected candidate cell, to detect from a first information element from the broadcast system information, that the cell is barred to communications devices, and to detect from a second information element of the received system information whether the selected candidate cell is barred to communications devices not configured to access the non-public network and configured to access the non-public network, and either to attach to the selected candidate cell, or rejecting the selected candidate cell depending on whether the communications device is configured to attach to the non-public networks or not.

Paragraph 29. A communications device for receiving data from a wireless communications network, the communications device comprising receiver circuitry configured to receive signals transmitted via a wireless access interface provided by the wireless communications network, transmitter circuitry configured to transmit signals via the wireless access interface, and controller circuitry configured to control the receiver circuitry to receive from the wireless communications network an indication of one or more cells belonging to one or more non-public networks which form part of the wireless communications network which also includes public network cells, to detect signals received from a serving cell and signals received from one or more candidate cells in order to determine whether to reselect one of the candidate cells according to a cell reselection procedure when in a mode in which the communications device is not transmitting data to or receiving data from the wireless communications network, to select, based on the signals received from the serving cell and the one or more candidate cells, one of the candidate cells, to determine whether the selected candidate cell can be accessed or not, and either to attach to the selected candidate cell, or rejecting the selected candidate cell depending on whether the communications device is configured to attach to one or more of the non-public networks or not, wherein the indication of the one or more cells belonging to one or more non-public networks is provided to the communications device using radio resource control signalling, the range of the physical cell identifiers being specific to the communications device.

Paragraph 30. The communications device of paragraph 29, wherein the redirection information includes a range of non-public network cell physical cell identifiers which the UE is allowed to access, the redirection information being a whitelist.

Paragraph 31. Circuitry for receiving data from a wireless communications network, the circuitry comprising receiver circuitry configured to receive signals transmitted via a wireless access interface provided by the wireless communications network, transmitter circuitry configured to transmit signals via the wireless access interface, and controller circuitry configured to control the receiver circuitry to receive from the wireless communications network an indication of a range of physical cell identifiers associated with one or more cells belonging to one or more non-public network which form part of the wireless communications network which also includes public network cells, to detect signals received from a serving cell and signals received from one or more candidates cells in order to reselect one of the candidates cells according to a cell reselection procedure when in a mode in which the communications device is not transmitting data to or receiving data from the wireless communications network, to select, based on the signals received from the serving cell and the one or more candidate cells, one of the candidate cells, to detect a physical cell identifier of the selected candidate cell, to determine whether the physical cell identifier is within the range of physical cell identifiers received from the wireless communications network, and either to attach to the selected candidate cell, or to reject the selected candidate cell depending on whether the communications device is configured to attach to one or more of the non-public networks or not.

Paragraph 32. Circuitry for receiving data from a wireless communications network, the circuitry comprising receiver circuitry configured to receive signals transmitted via a wireless access interface provided by the wireless communications network, transmitter circuitry configured to transmit signals via the wireless access interface, and controller circuitry configured to control the receiver circuitry to detect signals received from a serving cell and signals received from one or more candidate cells in order to reselect one of the candidate cells according to a cell reselection procedure when in a mode in which the communications device is not transmitting data to or receiving data from the wireless communications network, to select, based on the signals received from the serving cell and the one or more candidate cells, one of the candidate cells, wherein the selected candidate cell is a cell belonging to a non-public network, and the selecting the candidate cell to which the communications should attach for transmitting data to or receiving data from the non-public network comprises to receive system information broadcast from the selected candidate cell, to detect from a first information element from the broadcast system information, that the cell is barred to communications devices, and to detect from a second information element of the received system information whether the selected candidate cell is barred to communications devices not configured to access the non-public network and configured to access the non-public network, and either to attach to the selected candidate cell, or rejecting the selected candidate cell depending on whether the communications device is configured to attach to the non-public networks or not.

Paragraph 33. Circuitry for receiving data from a wireless communications network, the circuitry comprising receiver circuitry configured to receive signals transmitted via a wireless access interface provided by the wireless communications network,
transmitter circuitry configured to transmit signals via the wireless access interface, and
controller circuitry configured to control the receiver circuitry
to receive from the wireless communications network an indication of one or more cells belonging to one or more non-public networks which form part of the wireless communications network which also includes public network cells,
to detect signals received from a serving cell and signals received from one or more candidate cells in order to determine whether to reselect one of the candidate cells according to a cell reselection procedure when in a mode in which the communications device is not transmitting data to or receiving data from the wireless communications network,
to select, based on the signals received from the serving cell and the one or more candidate cells, one of the candidate cells,
to determine whether the selected candidate cell can be accessed or not, and either
to attach to the selected candidate cell, or rejecting the selected candidate cell depending on whether the communications device is configured to attach to one or more of the non-public networks or not, wherein the indication of the one or more cells belonging to one or more non-public networks is provided to the communications device using radio resource control signalling, the range of the physical cell identifiers being specific to the communications device.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] Holma H. and Toskala A, "LTE for UMTS OFDMA and SC-FDMA based radio access", John Wiley and Sons, 2009
[3] 3GPP TS 23.501 "System architecture for the 5G System (5G5)", Release 16

The invention claimed is:

1. A method of selecting a cell by a communications device in a wireless communications network, the method comprising:
receiving, by the communications device, from the wireless communications network an indication of a range of physical cell identifiers associated with one or more cells belonging to one or more non-public networks which form part of the wireless communications network but which are separate from cells of a public network also included in the wireless communications network,
detecting, by the communications device, signals received from a serving cell and signals received from one or more candidate cells in order to determine whether to reselect one of the candidate cells according to a cell reselection procedure when in a mode in which the communications device is not transmitting data to or receiving data from the wireless communications network, the signals received from the serving cell being received separately from the indication of the range of physical cell identifiers,
selecting, based on the signals received from the serving cell and the one or more candidate cells, one of the candidate cells,
detecting a physical cell identifier of the selected candidate cell,
determining whether the physical cell identifier is within the range of physical cell identifiers received from the wireless communications network, and
either attaching to the selected candidate cell, or rejecting the selected candidate cell depending on whether the communications device is configured to attach to one or more of the non-public networks or not.

2. The method of claim 1, wherein the communications device is configured to transmit data to or to receive data from the public network cells of the wireless communication network and not the non-public cells, and the determining whether the physical cell identifier is within the range of physical cell identifiers received from the wireless communications network, comprises:
determining that the physical cell identifier is within the range of the physical cell identifiers of the cells of the non-public networks,
rejecting the selected candidate cell, and
selecting another candidate cell.

3. The method of claim 2, the method comprising:
determining that the physical cell identifier is not within the range of the physical cell identifiers of the cells of the non-public networks, the selected candidate being a cell of the public network part, and
selecting the candidate cell to which the communications should attach.

4. The method of claim 1, wherein the communications device is configured to transmit data to and to receive data from the cells of one or more of the non-public networks of the wireless communication network, and the determining whether the physical cell identifier is within the range of physical cell identifiers received from the wireless communications network comprises:
determining that the physical cell identifier is within the range of the physical cell identifiers of the cells of the non-public networks, and
selecting the candidate cell to which the communications should attach for transmitting data to or receiving data from the non-public network.

5. The method of claim 4, the method comprising:
determining that the physical cell identifier is not within the range of the physical cell identifiers of the cells of the non-public networks, the selected candidate being a cell of the public network part, and
rejecting the selected candidate cell, and
selecting another candidate cell.

6. The method of claim 1, comprising:
receiving from the wireless communications network an indication of redirection information, the redirection information including one or more of physical cell identifiers which the communications device should select as a candidate for selection if the selected candidate cell is rejected by the communications device.

7. The method of claim 6, wherein the indication of the redirection information is received from the wireless communications network as part of a radio resource control signalling.

8. The method of claim 6, wherein the one or more of physical cell identifiers of the redirection information identify cells with a shared frequency of a wireless access interface provided by the wireless communications network.

9. The method of claim 6, wherein the redirection information includes a list of closed access group which can be accessed by the communications device.

10. The method of claim 6, wherein the redirection information includes an update of the range of physical cell identifiers associated with the one or more cells belonging to one or more non-public network which was received from the wireless communications network.

11. The method of claim 6, wherein the redirection information includes a range of non-public network cell physical cell identifiers which the UE is allowed to access.

12. The method of claim 11, wherein the redirection information is specific to the communications device.

13. The method of claim 6, wherein the redirection information includes a range of non-public network cell physical cell identifiers which the UE is not allowed to access.

14. The method of claim 1, comprising:
transmitting to the wireless communications network an automatic neighbour report indicating one or more identifiers of the one or more non-public networks which neighbour the currently selected cell.

15. A method of selecting a cell by a communications device in a wireless communications network, the method comprising:
detecting, by the communications device, signals received from a serving cell and signals received from one or more candidate cells in order to reselect one of the candidate cells according to a cell reselection procedure when in a mode in which the communications device is not transmitting data to or receiving data from the wireless communications network,
selecting, based on the signals received from the serving cell and the one or more candidate cells, one of the candidate cells, wherein the selected candidate cell is a cell belonging to a non-public network and is separate from cells belonging to a public network, and the selecting the candidate cell to which the communications should attach for transmitting data to or receiving data from the non-public network comprises:
receiving, by the communications device, system information broadcast from the selected candidate cell, the system information broadcast being received separately from the signals received from the serving cell and the one or more candidate cells,
detecting from a first information element from the system information, that the cell is barred to communications devices, and
detecting from a second information element of the system information whether the selected candidate cell is barred to communications devices not configured to access the non-public network and configured to access the non-public network, and
either attaching to the selected candidate cell, or rejecting the selected candidate cell depending on whether the communications device is configured to attach to the non-public networks or not.

16. The method of claim 15, wherein the communications device is configured to transmit data to and to receive data from the cells of one or more of the non-public networks of the wireless communication network, the attaching to the selected candidate cell comprises
selecting the candidate cell to which the communications should attach for transmitting data to or receiving data from the non-public network.

17. The method of claim 16, wherein the first information element forms part of a master information block transmitted for detection first by the communications device, and the second information element forms part of a system information block received after the master information block.

18. The method of claim 17, comprising:
declaring that a candidate cell is barred based on the indication provided by either the first or the second information elements.

19. A communications device for receiving data from a wireless communications network, the communications device comprising:
receiver circuitry configured to receive signals transmitted via a wireless access interface provided by the wireless communications network,
transmitter circuitry configured to transmit signals via the wireless access interface, and
controller circuitry configured to control the receiver circuitry;
to receive from the wireless communications network an indication of a range of physical cell identifiers associated with one or more cells belonging to one or more non-public network which form part of the wireless communications network but which are separate from cells of a public network also included in the wireless communications network,
to detect signals received from a serving cell and signals received from one or more candidates cells in order to reselect one of the candidates cells according to a cell reselection procedure when in a mode in which the communications device is not transmitting data to or receiving data from the wireless communications network, the signals received from the serving cell being received separately from the indication of the range of physical cell identifiers,
to select, based on the signals received from the serving cell and the one or more candidate cells, one of the candidate cells,
to detect a physical cell identifier of the selected candidate cell,
to determine whether the physical cell identifier is within the range of physical cell identifiers received from the wireless communications network, and
to either attach to the selected candidate cell, or to reject the selected candidate cell depending on whether the communications device is configured to attach to one or more of the non-public networks or not.

20. The communications device of claim 19, wherein the controller circuitry is configured with the receiver circuitry:
to transmit data to or to receive data from the public network cells of the wireless communication network and not the non-public cells, and
to determine whether the physical cell identifier is within the range of physical cell identifiers received from the wireless communications network, by determining that the physical cell identifier is within the range of the physical cell identifiers of the cells of the non-public networks, rejecting the selected candidate cell, and selecting another candidate cell.

* * * * *